US012736111B2

(12) United States Patent
Kamiyama et al.

(10) Patent No.: US 12,736,111 B2
(45) Date of Patent: Sep. 15, 2026

(54) AUTOMATIC TRANSMISSION UNIT FOR AN ELECTRIC VEHICLE

(71) Applicant: JATCO Ltd, Fuji (JP)

(72) Inventors: Akira Kamiyama, Sagamihara (JP); Kenichi Watanabe, Sagamihara (JP); Ikuo Hirose, Fujinomiya (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 19/101,454

(22) PCT Filed: Jul. 5, 2023

(86) PCT No.: PCT/JP2023/025023
§ 371 (c)(1),
(2) Date: Feb. 5, 2025

(87) PCT Pub. No.: WO2024/062734
PCT Pub. Date: Mar. 28, 2024

(65) Prior Publication Data

US 2026/0043459 A1 Feb. 12, 2026

(30) Foreign Application Priority Data

Sep. 22, 2022 (JP) ................................ 2022-151208

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0021* (2013.01); *F16H 2200/0039* (2013.01)

(58) Field of Classification Search
CPC ................. F16H 3/66; F16H 2003/445; F16H 2200/0021; F16H 2200/0039; F16H 2200/0027; F16H 2200/2038
See application file for complete search history.

(56) References Cited

U.S. PATENT DOCUMENTS 5,133,697 A * 7/1992 Hattori .................... F16H 3/666 475/276
2004/0023747 A1* 2/2004 Kohno .................... F16H 3/663 475/281

(Continued)

FOREIGN PATENT DOCUMENTS

CN 206000959 U 3/2017
CN 106195194 B 2/2019

(Continued)

*Primary Examiner* — Farhana Pervin
(74) *Attorney, Agent, or Firm* — Foley & Lardner LLP

(57) ABSTRACT

Provided is a unit including: an input element; an output element; and a gear device including a first rotational part, a second rotational part, a third rotational part, and a fourth rotational part arranged in this order on an alignment chart. The input element is connectable to the first rotational part and connectable to the second rotational part, the output element is connected to the third rotational part, and the fourth rotational part is switchable between a rotating state and a non-rotating state. The gear device includes a first planetary gear mechanism and a second planetary gear mechanism, the first rotational part is implemented by the first rotational element, the second rotational part is implemented by coupling the second rotational element and the sixth rotational element, the third rotational part is implemented by the fifth rotational element, and the fourth rotational part is implemented by coupling the third rotational element and the fourth rotational element.

9 Claims, 2 Drawing Sheets

(56) References Cited

U.S. PATENT DOCUMENTS

| | | | | |
|---|---|---|---|---|
| 2014/0371025 | A1* | 12/2014 | Oita | F16H 3/666<br>475/275 |
| 2015/0087464 | A1* | 3/2015 | Mellet | F16H 37/022<br>475/210 |
| 2023/0392673 | A1* | 12/2023 | Mock | B60K 17/08 |

FOREIGN PATENT DOCUMENTS

| | | | |
|---|---|---|---|
| DE | 10 2019 116 360 | A1 | 12/2020 |
| DE | 10 2019 119 951 | A1 | 1/2021 |

* cited by examiner

| | CL1 | CL2 | B1 |
|---|---|---|---|
| FIRST SPEED | | ● | ● |
| SECOND SPEED | ● | | ● |
| THIRD SPEED | ● | ● | |

AUTOMATIC TRANSMISSION UNIT FOR AN ELECTRIC VEHICLE

TECHNICAL FIELD

The present invention relates to a unit having a power transmission mechanism therein.

BACKGROUND ART

Patent Document 1 discloses an automatic transmission unit for an electric vehicle with two forward speeds. In the unit, by switching engaged states of two friction clutches, it is possible to implement a first speed and a second speed having a lower transmission gear ratio (=input rotation speed/output rotation speed) than that at the first speed.

Similar units are disclosed in Patent Documents 2 to 4.

PRIOR ART DOCUMENT

Patent Document

Patent Document 1: German Patent Application Publication No. 102019116360

Patent Document 2: German Patent Application Publication No. 102019119951

Patent Document 3: CN106195194A

Patent Document 4: CN206000959U

SUMMARY OF INVENTION

In the automatic transmission unit for an electric vehicle with two forward speeds, a torque amplification effect due to deceleration becomes higher as the transmission gear ratio at the first speed is increased, so that a maximum torque of a motor can be reduced as the transmission gear ratio at the first speed is increased, and a motor having a small size can be selected. On the other hand, the smaller the transmission gear ratio at the second speed, the lower a rotation speed of the motor at the time of implementing a certain vehicle speed, which is advantageous during high-speed cruising.

However, when the transmission gear ratios at the first speed and the second speed are respectively set based on the above design concept, a step ratio (=transmission gear ratio at first speed/transmission gear ratio at second speed) at the time of switching between the first speed and the second speed is increased, and a shift shock is increased.

The present invention has been made in view of such technical problems, and an object of the present invention is to reduce a step ratio at the time of shifting in a unit having a power transmission mechanism therein.

According to an aspect of the present invention, there is provided a unit including:

an input element;

an output element; and a gear device including a first rotational part, a second rotational part, a third rotational part, and a fourth rotational part arranged in this order on an alignment chart, in which the input element is connectable to the first rotational part and connectable to the second rotational part, the output element is connected to the third rotational part, the fourth rotational part is switchable between a rotating state and a non-rotating state, the gear device includes a first planetary gear mechanism including a first rotational element, a second rotational element, and a third rotational element, the second rotational element being disposed between the first rotational element and the third rotational element on the alignment chart, and a second planetary gear mechanism including a fourth rotational element, a fifth rotational element, and a sixth rotational element, the fifth rotational element being disposed between the fourth rotational element and the sixth rotational element on the alignment chart, the first rotational part is implemented by the first rotational element, the second rotational part is implemented by coupling the second rotational element and the sixth rotational element, the third rotational part is implemented by the fifth rotational element, and the fourth rotational part is implemented by coupling the third rotational element and the fourth rotational element.

According to the above aspect, three gear positions are implemented by switching a connection destination of the input element (one or both of first rotational part and second rotational part) and a rotating state of the fourth rotational part. Since the step ratio is reduced, an appropriate transmission gear ratio can be set according to a speed range. Since the transmission gear ratio is 1 at a third speed, the power transmission loss caused by differential rotation among the rotational parts can be reduced.

DESCRIPTION OF EMBODIMENTS

Figures 1, 2:
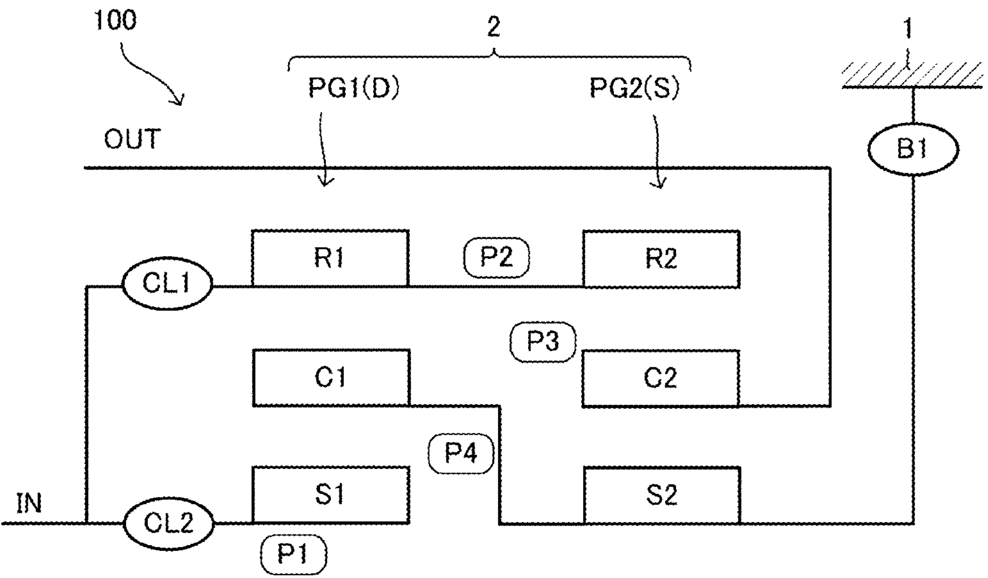
FIG. 1 is a skeleton diagram of a unit according to an embodiment of the present invention.
FIG. 2 is an engagement table showing engaged states of respective engagement elements at respective gear positions.

Hereinafter, embodiments of the present invention will be described with reference to the accompanying drawings. Definitions of terms used in the present description are as follows.

The term of "unit" means a general device having a power transmission mechanism such as a gear mechanism and a differential gear mechanism therein, and includes a motor unit having a motor and a power transmission mechanism, an automatic transmission unit, a reducer unit, and the like.

The term of "transmission gear ratio" is a value obtained by dividing an input rotation speed of the unit by an output rotation speed thereof. The term of "input rotation" includes not only rotation input to the unit from a power source outside the unit but also rotation input to the unit from a power source inside the unit.

The term of "step ratio" is a value obtained by dividing a larger transmission gear ratio (for low speed) by a smaller transmission gear ratio (for high speed) with respect to two transmission gear ratios implemented by the unit.

The term of "axial direction" means an axial direction of a rotating shaft of a component constituting the unit. The component is a motor, a gear mechanism, a differential gear mechanism, or the like. The term of "radial direction" means a radial direction from a central axis of the rotating shaft.

The term of "housing" means an accommodation body that accommodates a motor, an inverter, and a power transmission mechanism, and includes one or more cases. An aspect in which a case that accommodates the motor, a case that accommodates the inverter, and a case that accommodates the power transmission mechanism are integrally formed is called "3-in-1".

The term of "motor" means a rotating electrical machine having an electric motor function, and may have a generator function in addition to the electric motor function.

The expression of "an element A is connected to an element B" means that the element A is connected to the element B on an upstream or downstream side in such a manner that power can be transmitted between the element A and the element B. An input side of the power is the upstream side, and an output side of the power is the downstream side. The element A is not limited to be connected to the element B directly or via another member, and may be connected to the element B via a clutch or the like.

The expression of "the element A is coupled to the element B" means a state in which the element A and the element B are directly coupled to each other or indirectly coupled to each other via another member, and the element A and the element B are integrated. In other words, it can be said to be a state in which the element A and the element B rotate integrally. In addition, the expression means a state in which the element A and the element B are connected to each other without a brake or a clutch interposed therebetween, and can be said to be a state in which the element A and the element B are always connected to each other.

The expression of "the element A is fixed to the element B" includes both an aspect in which the element A is directly fixed to the element B and an aspect in which the element A is fixed to the element B via an element C other than the elements A and B. The expression of "the element A is fixed" means that the element A is fixed to another element and is in a non-rotatable state.

The expression of "the element A and the element B overlap each other when viewed in a predetermined direction" refers to a state in which the element A and the element B are arranged in the predetermined direction (axial direction, radial direction, gravity direction, or the like), and the element A and the element B at least partially overlap each other when observed from the predetermined direction. This is synonymous with the expression of "the element A and the element B overlap in the predetermined direction". In a case where the element A and the element B overlap each other when viewed in the axial direction, the element A and the element B are coaxial. In a case where the element A and the element B are drawn so as to be arranged in the predetermined direction in the drawings, it means that the element A and the element B overlap each other when viewed in the predetermined direction.

On the other hand, the expression of "the element A and the element B do not overlap each other when viewed in the predetermined direction" refers to a state in which the element A and the element B are not arranged in the predetermined direction (axial direction, radial direction, gravity direction, vehicle traveling direction, or the like) and there is no portion at which the element A and the element B overlap each other when viewed from the predetermined direction. This is synonymous with the expression of "the element A and the element B do not overlap each other in the predetermined direction". In a case where the element A and the element B are drawn so as not to be arranged in the predetermined direction in the drawings, it means that the element A and the element B do not overlap each other when viewed in the predetermined direction.

The expression of "the element A is disposed between the element B and the element C when viewed in the predetermined direction" means that the element A is observed to be between the element B and the element C when observed from the predetermined direction (axial direction, radial direction, gravity direction, or the like). For example, in a case where the element B, the element A, and the element C are arranged in this order along the axial direction, it is observed that the element A is located between the element B and the element C when viewed in the radial direction, so that it can be said that the element A is located between the element B and the element C. The element A does not need to overlap the elements B and C when viewed in the axial direction. In a case where the element A is drawn between the element B and the element C in the drawings, it means that the element A is located between the element B and the element C when viewed in the predetermined direction.

The expression of "the element A is disposed axially outward of the element B" means that the element A is disposed on one side in the axial direction or the other side in the axial direction of the element B, and includes a case where the element A and the element B overlap each other when viewed in the axial direction, and a case where the element A and the element B have different positions in the radial direction and the element A and the element B do not overlap each other.

The expression of "the element A is disposed radially outward (or radially inward) of the element B" means that a radial position of the element A is located outward (or inward) of a radial position of the element B, and includes a case where the element A and the element B overlap each other when viewed in the radial direction, and a case where the element A and the element B have different positions in the axial direction and the element A and the element B do not overlap each other.

The expression of "disposed close to each other" means a state in which there is a portion where two elements overlap each other when viewed in the axial direction or the radial direction, and no other element is sandwiched between the two elements. For example, the expression of "two engagement elements are disposed close to each other" means that no planetary gear mechanism or the like is disposed between the two engagement elements. In a case where no other element is drawn between the element A and the element B in the drawings, it means that the element A and the element B are disposed close to each other.

The terms of "one side of the engagement element" and "the other side of the engagement element" mean two elements included in the engagement element that become relatively non-rotatable when the engagement element is in an engaged state and become relatively rotatable when the engagement element is in a released state. The terms of "one side of the engagement element" and "the other side of the engagement element" may be a combination of rotational elements or a combination of a rotational element and a non-rotational element, and are generally referred to as a clutch for the former and a brake for the latter. Further, the term of "a single side of the engagement element" means either of "one side of the engagement element" and "the other side of the engagement element".

Other terms are appropriately defined in the description.

FIG. 1 is a skeleton diagram illustrating a basic structure of a unit 100 according to an embodiment of the present invention. The unit 100 is an automatic transmission unit with three forward speeds for an electric vehicle that shifts rotation input to an input element IN from a motor (not illustrated) as a power source at a transmission gear ratio corresponding to a gear position and transmits the shifted rotation from an output element OUT to a drive wheel (not illustrated). The input element IN and the output element OUT are implemented by gears, rotating shafts, and the like, respectively. Since the motor can switch between forward rotation and reverse rotation, the unit 100 is clearly different in design concept from a unit for a vehicle using an internal combustion engine as a power source in that the unit 100 does not have a reverse gear.

The unit 100 is a so-called 3-in-1 unit in which the input element IN, a gear device 2, first to third engagement elements CL1, CL2, and B1, the output element OUT, the motor (not illustrated), and an inverter (not illustrated) are accommodated in a housing 1. The housing 1 is non-rotatably fixed to the vehicle.

One end of the input element IN is connected to an output shaft of the motor, and the input element IN rotates by power input from the motor. A rotation speed of the input element IN is an input rotation speed of the unit 100. The motor is electrically connected to a battery (not illustrated) outside the unit 100 via the inverter, and functions as an electric motor by receiving power supply from the battery. The motor can also function as a generator.

The gear device 2 is implemented by disposing a first planetary gear mechanism PG1 and a second planetary gear mechanism PG2 to be close and coupling rotational elements of each other at two places.

The first planetary gear mechanism PG1 is a double pinion planetary gear mechanism including a first sun gear S1 as a first rotational element, a first ring gear R1 as a second rotational element, a plurality of inner pinion gears (not illustrated), a plurality of outer pinion gears (not illustrated) that mesh with the plurality of inner pinion gears, and a first carrier C1 as a third rotational element that rotatably supports the plurality of inner pinion gears and the plurality of outer pinion gears. The first sun gear S1 meshes with the plurality of inner pinion gears, and the first ring gear R1 meshes with the plurality of outer pinion gears.

The second planetary gear mechanism PG2 is a single pinion planetary gear mechanism including a second sun gear S2 as a fourth rotational element, a plurality of second pinion gears (not illustrated), a second carrier C2 as a fifth rotational element that rotatably supports the plurality of second pinion gears, and a second ring gear R2 as a sixth rotational element. The second sun gear S2 meshes with the plurality of second pinion gears, and the plurality of second pinion gears mesh with the second ring gear R2.

D and S in parentheses next to reference numerals PG1 and PG2 indicate that the first planetary gear mechanism PG1 and the second planetary gear mechanism PG2 are a double pinion planetary gear mechanism and a single pinion planetary gear mechanism, respectively.

The first carrier C1 is coupled to the second sun gear S2. The first ring gear R1 is coupled to the second ring gear R2. By coupling the first planetary gear mechanism PG1 and the second planetary gear mechanism PG2 at two places in this manner, a first rotational part P1 is implemented by the first sun gear S1, a second rotational part P2 is implemented by the first ring gear R1 and the second ring gear R2, a third rotational part P3 is implemented by the second carrier C2, and a fourth rotational part P4 is implemented by the first carrier C1 and the second sun gear S2.

A rotation speed of the output element OUT is an output rotation speed of the unit 100.

The first engagement element CL1 is a hydraulic clutch or an electric clutch. In a case where two portions of the first engagement element CL1 to be engaged when the first engagement element CL1 is in the engaged state are defined as one side and the other side, the one side is connected to the input element IN, and the other side is connected to the second rotational part P2 implemented by the first ring gear R1 and the second ring gear R2. As a result, when the first engagement element CL1 is engaged, the input element IN can be connected to the second rotational part P2 implemented by the first ring gear R1 and the second ring gear R2.

The second engagement element CL2 is a hydraulic clutch or an electric clutch. In a case where two portions of the second engagement element CL2 to be engaged when the second engagement element CL2 is in the engaged state are defined as one side and the other side, the one side is connected to the input element IN, and the other side is connected to the first rotational part P1 implemented by the first sun gear S1. As a result, when the second engagement element CL2 is engaged, the input element IN can be connected to the first rotational part P1 implemented by the first sun gear S1.

The one side of the first engagement element CL1 and the one side of the second engagement element CL2 are connected to the input element IN and rotate integrally with each other, so that the elements can be commonly used, that is, implemented as an integrated component. For example, when each of the first engagement element CL1 and the second engagement element CL2 is implemented by a multi-plate clutch in which a plurality of friction plates are disposed between a drum and a hub, the first engagement element CL1 and the second engagement element CL2 may be implemented as an integrated component by forming the hub (of one element) on an outer periphery of the drum (of the other element). Accordingly, the number of components of the unit 100 can be reduced.

The third engagement element B1 is a hydraulic brake or an electric brake. In a case where two portions of the third engagement element B1 to be engaged when the third engagement element B1 is in an engaged state are defined as one side and the other side, the one side is connected to the fourth rotational part P4 implemented by the first carrier C1 and the second sun gear S2, and the other side is fixed to the housing 1. As a result, when the third engagement element B1 is engaged, the fourth rotational part P4 implemented by the first carrier C1 and the second sun gear S2 can be fixed to the housing 1.

As an actuator of each of the first engagement element CL1 and the third engagement element B1, an actuator (electric actuator that is fixed to housing 1 or the like in relation of reaction force and needs to be connected to power cable, hydraulic actuator in which hydraulic supply unit is attached to housing 1 or the like and which needs to be connected to hydraulic supply unit by piping or the like) that is susceptible to layout restriction can be used in addition to an actuator (hydraulic actuator that supplies hydraulic pressure from control valve unit or the like) that is less susceptible to layout restriction. On the other hand, it is preferable to use, as the actuator of the second engagement element CL2, an actuator which is less susceptible to layout restriction because the second engagement element CL2 is disposed on the inner peripheral side of the first engagement element CL1.

The third engagement element B1 may be implemented by a selectable one-way clutch. The selectable one-way clutch is a clutch that is implemented by a pair of ratchet mechanisms capable of switching an operation state by an electric actuator and restrict rotation in different directions, and that enters a one-way clutch state when only one of the pair of ratchet mechanisms is caused to operate, and enters an engaged state when both of the pair of ratchet mechanisms are caused to operate.

By providing the first to third engagement elements CL1, CL2, and B1, one of the first engagement element CL1 and the second engagement element CL2 is engaged and the other is released, so that the input element IN can be selectively connected to the first rotational part P1 implemented by the first sun gear S1 or the second rotational part P2 implemented by the first ring gear R1 and the second ring gear R2. By engaging both the first engagement element CL1 and the second engagement element CL2, the input element IN can be connected to the first rotational part P1 and the second rotational part P2.

By changing the engaged state of the third engagement element B1, the fourth rotational part P4 implemented by the first carrier C1 and the second sun gear S2 can be switched to the rotating state or the non-rotating state.

When viewed in the radial direction, the first to third engagement elements CL1, CL2, and B1 are disposed axially outward of the gear device 2. Since no engagement element is disposed between the first planetary gear mechanism PG1 and the second planetary gear mechanism PG2, the degree of freedom in layout of the first to third engagement elements CL1, CL2, and B1 is increased, and the dimension of the unit 100 in the axial direction can be reduced.

When viewed in the axial direction, the first to third engagement elements CL1, CL2, and B1 may overlap the gear device 2. When these elements are overlapped, the dimension of the unit 100 in the radial direction can be reduced.

FIG. 2 is an engagement table showing relations between the engaged states of the first to third engagement elements CL1, CL2, and B1 and gear positions implemented in the unit 100. In the table, a filled circle indicates an engaged state, and no mark indicates a released state.

As shown in the engagement table, the first speed is implemented by engaging the second engagement element CL2 and the third engagement element B1 and releasing the first engagement element CL1. The second speed is implemented by engaging the first engagement element CL1 and the third engagement element B1 and releasing the second engagement element CL2. The third speed is implemented by engaging the first engagement element CL1 and the second engagement element CL2 and releasing the third engagement element B1.

All gear positions are implemented by engaging two of the first to third engagement elements CL1, CL2, and B1, and the number of engagement elements to be released is one. In a case where drag torque is generated by contact between portions that cause relative rotation even when the engagement element to be released is in the released state as in the multi-plate clutch, it is possible to reduce the mechanical loss as the number of the engagement elements to be released for implementing the gear position decreases. In the present embodiment, the number of engagement elements to be released is one at any gear position, and thus when engagement elements that generate drag torque are used as the first to third engagement elements CL1, CL2, and B1, it is also possible to suppress the mechanical loss and improve the electric cost of the vehicle on which the unit 100 is mounted.

Figure 3:
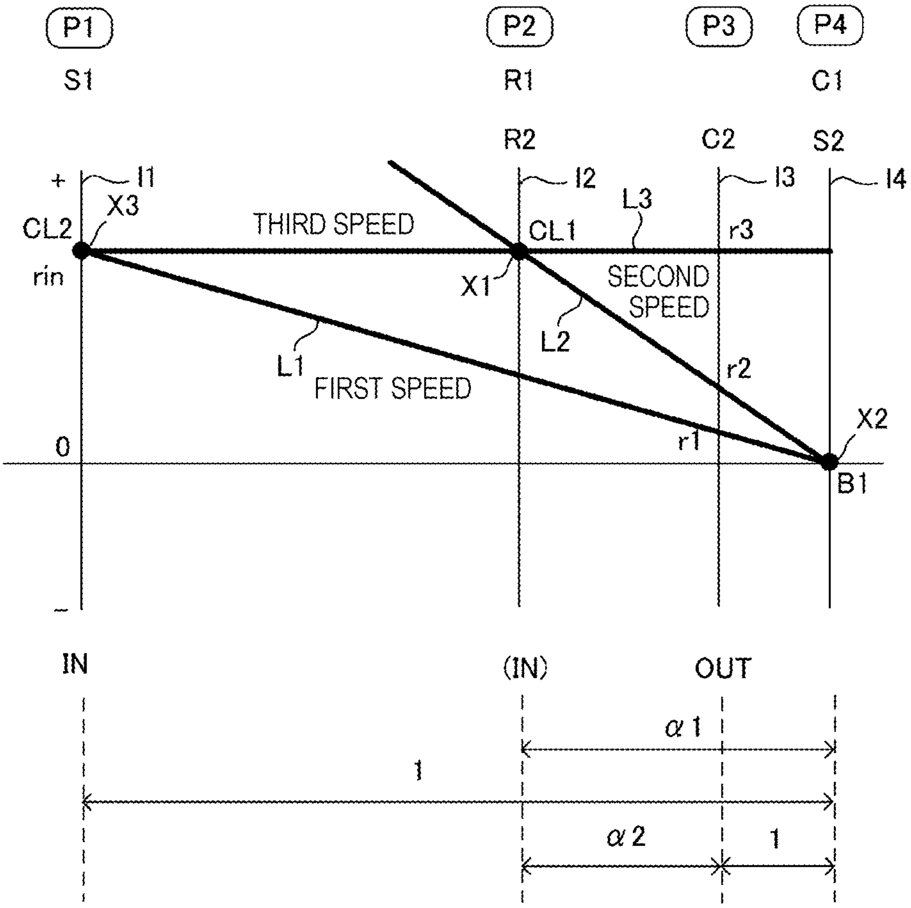
FIG. 3 is an alignment chart of the unit.

FIG. 3 is an alignment chart of the unit 100. On the alignment chart, the first to fourth rotational parts P1 to P4 are arranged in this order, and the rotational parts correspond to vertical lines l1 to l4, respectively.

Since the first planetary gear mechanism PG1 is a double pinion planetary gear mechanism, the first ring gear R1 is disposed between the first sun gear S1 and the first carrier C1. Since the second planetary gear mechanism PG2 is a single pinion planetary gear mechanism, the second carrier C2 is disposed between the second sun gear S2 and the second ring gear R2.

When the first engagement element CL1 is engaged and the second engagement element CL2 is released, the input element IN is connected to the second rotational part P2, and thus the vertical line l2 corresponds to the input element IN. Conversely, when the first engagement element CL1 is released and the second engagement element CL2 is engaged, the input element IN is connected to the first rotational part P1, and thus the vertical line l1 corresponds to the input element IN.

Since the output element OUT is connected to the third rotational part P3, the vertical line l3 corresponds to the output element OUT.

An interval al between the vertical line l4 and the vertical line l2, when an interval between the vertical line l1 and the vertical line l4 is defined as 1, is a value obtained by dividing the number of teeth of the first sun gear S1 by the number of teeth of the first ring gear R1. In addition, an interval $\alpha 2$ between the vertical line l3 and the vertical line l2, when an interval between the vertical line l4 and the vertical line l3 is defined as 1, is a value obtained by dividing the number of teeth of the second sun gear S2 by the number of teeth of the second ring gear R2.

On the alignment chart, straight lines L1 to L3 corresponding to the respective gear positions are drawn. Rotation speeds of the respective rotational parts P1 to P4 at the respective gear positions are represented by vertical coordinates of intersections of the straight lines L1 to L3 corresponding to the respective gear positions and the vertical lines l1 to l4.

At the first speed, the second engagement element CL2 and the third engagement element B1 are engaged, and the first engagement element CL1 is released. As a result, the rotation speeds of the input element IN and the first rotational part P1 become equal to each other, and the rotation speed of the fourth rotational part P4 becomes zero, so that the straight line L1 corresponding to the first speed is a straight line passing through a point X3 and a point X2. The rotation speed of the output element OUT is r1 which is the vertical coordinate of the intersection of the straight line L1 and the vertical line l3. Therefore, the transmission gear ratio at the first speed is rin/r1, where rin is the rotation speed of the input element IN.

At the second speed, the first engagement element CL1 and the third engagement element B1 are engaged, and the second engagement element CL2 is released. As a result, the rotation speeds of the input element IN and the second rotational part P2 become equal to each other, and the rotation speed of the fourth rotational part P4 becomes zero, so that the straight line L2 corresponding to the second speed is a straight line passing through a point X1 and the point X2 and having a larger inclination than the straight line L1. The rotation speed of the output element OUT is r2 which is the vertical coordinate of the intersection of the straight line L2 and the vertical line l3. Therefore, the transmission gear ratio at the second speed is rin/r2, where rin is the rotation speed of the input element IN. Since r2 is larger than r1, the transmission gear ratio at the second speed is smaller than the transmission gear ratio at the first speed.

At the third speed, the first engagement element CL1 and the second engagement element CL2 are engaged, and the third engagement element B1 is released. As a result, the rotation speeds of the input element IN, the first to fourth rotational parts P1 to P4, and the output element OUT become equal to one another, so that the straight line L3 corresponding to the third speed becomes a straight line having an inclination of zero and passing through the point X3 and the point X1. Since the rotation speeds of the input element IN and the output element OUT are equal to each other, the transmission gear ratio at the third speed is 1, which is smaller than the transmission gear ratios at the first speed and the second speed.

Therefore, since three gear positions can be implemented in the unit 100, a step ratio thereof is smaller than that in a unit having two forward speeds, and a shock at the time of shifting can be suppressed to be smaller than that in the unit having two forward speeds. In addition, since the first to third speeds can be used for low speed, medium speed, and high speed, respectively, an appropriate transmission gear ratio can be set according to a speed range.

At the third speed, the transmission gear ratio is 1. That is, since all the rotational parts P1 to P4 constituting the gear device 2 rotate at the same rotation speed, it is possible to reduce the power transmission loss caused by the differential rotation among the rotational parts. Since the use frequency of the third speed for high-speed cruising is high, a high effect of improving the electric cost can be exerted by implementing the transmission gear ratio of 1 at the third speed.

Next, operations and effects of the embodiment of the present invention will be described.

(1) In the example illustrated in FIG. 1, the unit 100 includes the input element IN, the output element OUT, and the gear device 2 (FIG. 3) including the first rotational part P1, the second rotational part P2, the third rotational part P3, and the fourth rotational part P4 arranged in this order on an alignment chart.

The input element IN is connectable to the first rotational part P1 and connectable to the second rotational part P2.

The output element OUT is connected to the third rotational part P3.

The fourth rotational part P4 is switchable between a rotating state and a non-rotating state.

The gear device 2 includes the double pinion first planetary gear mechanism PG1 (FIG. 3) including the first sun gear S1, the first ring gear R1, and the first carrier C1, the first ring gear R1 being disposed between the first sun gear S1 and the first carrier C1 on the alignment chart, and the single pinion second planetary gear mechanism PG2 (FIG. 3) including the second sun gear S2, the second carrier C2, and the second ring gear R2, the second carrier C2 being disposed between the second sun gear S2 and the second ring gear R2 on the alignment chart.

The first rotational part P1 is implemented by the first sun gear S1.

The second rotational part P2 is implemented by coupling the first ring gear R1 and the second ring gear R2.

The third rotational part P3 is implemented by the second carrier C2.

The fourth rotational part P4 is implemented by coupling the first carrier C1 and the second sun gear S2.

In the example illustrated in FIG. 1, three gear positions can be implemented by switching a connection destination of the input element IN (one or both of first rotational part P1 and second rotational part P2) and a rotating state of the fourth rotational part P4. Since the step ratio decreases, an appropriate transmission gear ratio can be set according to the speed range, and since the transmission gear ratio is 1 at the third speed, the power transmission loss caused by the differential rotation among the rotational parts can be reduced.

(2) Switching of a connection destination of the input element IN and the rotating state of the fourth rotational part P4 can be implemented by the first to third engagement elements CL1, CL2, and B1.

In the example illustrated in FIG. 1, the unit 100 includes the first engagement element CL1, the second engagement element CL2, and the third engagement element B1.

One side of the first engagement element CL1 is connected to the input element IN.

The other side of the first engagement element CL1 is connected to the second rotational part P2.

One side of the second engagement element CL2 is connected to the input element IN.

The other side of the second engagement element CL2 is connected to the first rotational part P1.

One side of the third engagement element B1 is connected to the fourth rotational part P4.

The other side of the third engagement element B1 is fixed.

With this configuration, when viewed in the axial direction, the first to third engagement elements CL1, CL2, and B1 may overlap the gear device 2. When these elements are overlapped, the dimension of the unit 100 in the radial direction can be reduced.

(3) In the example illustrated in FIG. 1, the first to third engagement elements CL1, CL2, and B1 are disposed axially outward of the gear device 2. As a result, the degree of freedom in layout of the first to third engagement elements CL1, CL2, and B1 is increased, and the dimension of the unit 100 in the axial direction can be reduced.

(4) In the example illustrated in FIG. 1, three gear positions are implemented by changing two elements to be engaged among the first to third engagement elements CL1, CL2, and B1 (FIG. 2). The number of engagement elements to be released is one at any gear position, and thus when engagement elements that generate drag torque are used as the first to third engagement elements CL1, CL2, and B1, it is also possible to suppress the mechanical loss and improve the electric cost of the vehicle on which the unit 100 is mounted.

(5) In the example illustrated in FIG. 1, the one side of the first engagement element CL1 and the one side of the second engagement element CL2 may be implemented as an integrated component. Accordingly, the number of components of the unit 100 can be reduced.

Although the embodiment of the present invention has been described above, the above embodiment merely exemplifies application examples of the present invention and does not intend to limit the technical scope of the present invention to the specific configurations of the above embodiment.

For example, the skeleton diagram illustrated in FIG. 1 is some of the application examples of the present invention, and the skeleton diagram of the unit to which the present invention is applied is not limited thereto.

The first planetary gear mechanism PG1 and the second planetary gear mechanism PG2 may be either a single pinion planetary gear mechanism or a double pinion planetary gear mechanism.

The present application claims a priority of Japanese Patent Application No. 2022-151208 filed with the Japan Patent Office on Sep. 22, 2022, all the contents of which are hereby incorporated by reference.

DESCRIPTION OF REFERENCE SIGNS

1 housing
2 gear device
100 unit
CL1 first engagement element
CL2 second engagement element
B1 third engagement element
S1 first sun gear
S2 second sun gear
C1 first carrier
C2 second carrier
R1 first ring gear
R2 second ring gear
P1 first rotational part
P2 second rotational part
P3 third rotational part
P4 fourth rotational part
IN input element
OUT output element
PG1 first planetary gear mechanism
PG2 second planetary gear mechanism

The invention claimed is:

1. A unit comprising:
an input element;
an output element; and
a gear device including a first rotational part, a second rotational part, a third rotational part, and a fourth rotational part arranged in this order on an alignment chart, wherein
the input element is connectable to the first rotational part and connectable to the second rotational part,
the output element is connected to the third rotational part,
the fourth rotational part is switchable between a rotating state and a non-rotating state,
the gear device includes
a first planetary gear mechanism including a first rotational element, a second rotational element, and a third rotational element, the second rotational element being disposed between the first rotational element and the third rotational element on the alignment chart, and
a second planetary gear mechanism including a fourth rotational element, a fifth rotational element, and a sixth rotational element, the fifth rotational element being disposed between the fourth rotational element and the sixth rotational element on the alignment chart,
the first rotational part is implemented by the first rotational element,
the second rotational part is implemented by coupling the second rotational element and the sixth rotational element to rotate integrally,
the third rotational part is implemented by the fifth rotational element, and
the fourth rotational part is implemented by coupling the third rotational element and the fourth rotational element to rotate integrally.

2. The unit according to claim 1, further comprising:
a first engagement element;
a second engagement element; and
a third engagement element, wherein
one side of the first engagement element is connected to the input element,
the other side of the first engagement element is connected to the second rotational part,
one side of the second engagement element is connected to the input element,
the other side of the second engagement element is connected to the first rotational part,
one side of the third engagement element is connected to the fourth rotational part, and
the other side of the third engagement element is fixed.

3. The unit according to claim 2, wherein
each of the first to third engagement elements is disposed axially outward of the gear device.

4. The unit according to claim 2, wherein
three gear positions are implemented by changing two elements to be engaged among the first to third engagement elements.

5. The unit according to claim 2, wherein
the one side of the first engagement element and the one side of the second engagement element are implemented as an integrated component.

6. The unit according to claim 1, wherein
the second rotational part is configured by the second rotational element and the sixth rotational element being always connected to rotate integrally, and
the fourth rotational part is configured by the third rotational element and the fourth rotational element being always connected to rotate integrally.

7. The unit according to claim 1, wherein
the third rotational part is implemented by a single rotational element of the first planetary gear mechanism.

8. The unit according to claim 1, wherein
the first through third rotational elements are respectively one of a first sun gear, a first carrier, and a first ring gear of the first planetary gear mechanism, and
the fourth through sixth rotational elements are respectively one of a second sun gear, a second carrier, and a second ring gear of the second planetary gear mechanism.

9. The unit according to claim 1, wherein
the first through third rotational elements are a first sun gear, a first ring gear, and a first carrier of the first planetary gear mechanism, respectively, and
the fourth through sixth rotational elements are a second sun gear, a second carrier, and a second ring gear of the second planetary gear mechanism, respectively.

* * * * *